Figure 1:
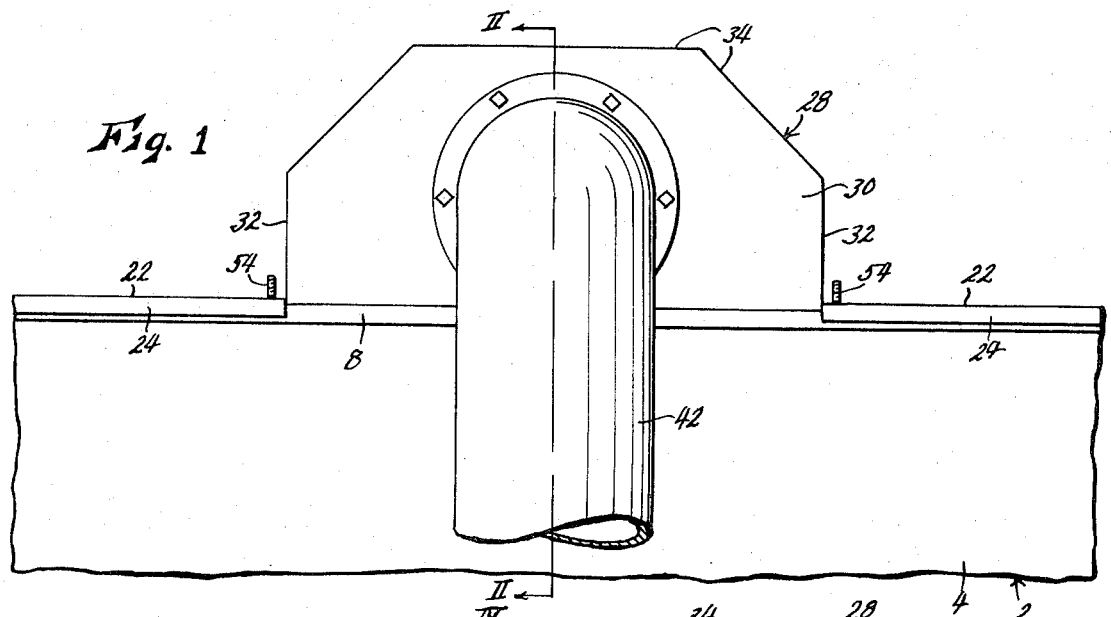

United States Patent [19]
Thompson

[11] 3,777,988
[45] Dec. 11, 1973

[54] LIQUID DISTRIBUTING SYSTEM FOR SPRINKLER PANS

[75] Inventor: Ralph F. Thompson, Grandview, Mo.

[73] Assignee: Salco, Inc., Grandview, Mo.

[22] Filed: Apr. 6, 1972

[21] Appl. No.: 241,759

[52] U.S. Cl.................. 239/553.3, 239/562, 62/64, 62/374
[51] Int. Cl............................................. B05b 1/14
[58] Field of Search.................. 239/76, 548, 553.3, 239/553.5, 562, 556; 62/62, 64, 373, 374, 375, 376

[56] References Cited
UNITED STATES PATENTS

| | | | |
|---|---|---|---|
| 3,296,818 | 1/1967 | Buxton.............................. | 62/64 X |
| 3,006,774 | 10/1961 | Zebarth............................ | 62/64 UX |
| 3,405,531 | 10/1968 | Davis, Jr. et al.................. | 62/374 X |

Primary Examiner—M. Henson Wood, Jr.
Assistant Examiner—John J. Love
Attorney—John A. Hamilton

[57] ABSTRACT

A liquid distributing system for perforated sprinkler pans consisting of a header box adapted to be disposed over a sprinkler pan intermediate its ends and to which liquid is supplied, the box having openings in the walls thereof for directing liquid toward both ends of the pan, and having an adjustably tiltable floor whereby to regulate the size and contour of the openings, the floor having adjustable openings for supplying liquid to the portion of the pan directly below it.

6 Claims, 5 Drawing Figures

PATENTED DEC 11 1973 3,777,988

LIQUID DISTRIBUTING SYSTEM FOR SPRINKLER PANS

This invention relates to new and useful improvements in liquid distributing systems for sprinkler pans, and has particular reference to a system having novel means for insuring an even supply of liquid to all parts of the perforated floor of the pan.

Sprinkler pans or trays with perforated floors are in wide usage for delivering liquids to material disposed therebeneath, for example in delivering a liquid coolant, such as refrigerated glycol, or a mixture of glycol and water, to food products disposed within, or being conveyed through, a cabinet disposed beneath the pan. However, there has always been the problem of insuring a uniform supply of liquid to all portions of the perforated floor of the pan, to insure an even rate of coverage of the entire horizontal cross-sectional area of the cabinet. Obviously, a disproportionately great percentage of liquid deposited in a restricted area of the pan will pass through the perforations of that area, with progressively smaller portions of the liquid reaching perforations progressively more distant from the deposit area, with the result that the food product or other material beneath the more distant parts of the pan receives deficient amounts of liquid, or even none at all in the case of very large pans. The problem is of course most pronounced in very large pans, pans perhaps four feet wide and thirty or forty feet long being common. The usual solution to the problem is the provision of a network of pipes and nozzles disposed over the pan, and operable to deliver liquid simultaneously to many different, closely spaced points of the area of the pan. This solution, however, has the disadvantages that the piping network is expensive, and that the power requirement for pumping the liquid through such a network, in the large quantities usually required, is very high, requiring the use of powerful and expensive pumps and motors.

The primary object of the present invention, therefor, is the provision of a distribution system which largely overcomes all of the above enumerated difficulties, accomplishing an even, uniform distribution of the liquid over the entire area of the pan, by means which are far less expensive, in both construction costs and power requirements, than any previously used system.

Another object is the provision of a distribution system of the character described in which the liquid is delivered to a single point above the pan, through a single, wide-open inlet, to a header box disposed above only a small portion of the area of the pan, distribution of the liquid from the box to all portions of the pan area being performed by controlled gravity flow of liquid from said header box.

A further object is the provision of a distribution system of the character described which is readily adjustable to provide uniform coverage of the pan floor despite variations in such factors as the pan shape and area, specific placement of the header box relative to the pan, and variable flow rates required, as well as for the seemingly unpredictable variation of flow characteristics which occur between nominally quite similar installations.

Generally, these objects are accomplished by the use of a header box having laterally directed openings directed toward the most remote portions of the pan, and having a floor which is adjustably and universally tiltable to control and change the size and contour of said openings. Liquid is accumulated to a substantial depth above the openings of the box, so that it emerges from said openings with sufficient velocity to reach the farthest portions of the pan floor before all of it can pass through the pan perforations. Where the velocity is very high, producing a tendency of the liquid to "sweep over" the pan perforations without passing therethrough, suitable retarding baffles may be used. Also, the header box floor may be provided with controlled apertures for supplying liquid to the pan area directly therebeneath, this being an area of the pan which may be left comparatively "void" of liquid by the velocity of the liquid emerging from the horizontally directed openings.

Other objects are simplicity and economy of construction, and efficiency and dependability of operation.

Figure 2:
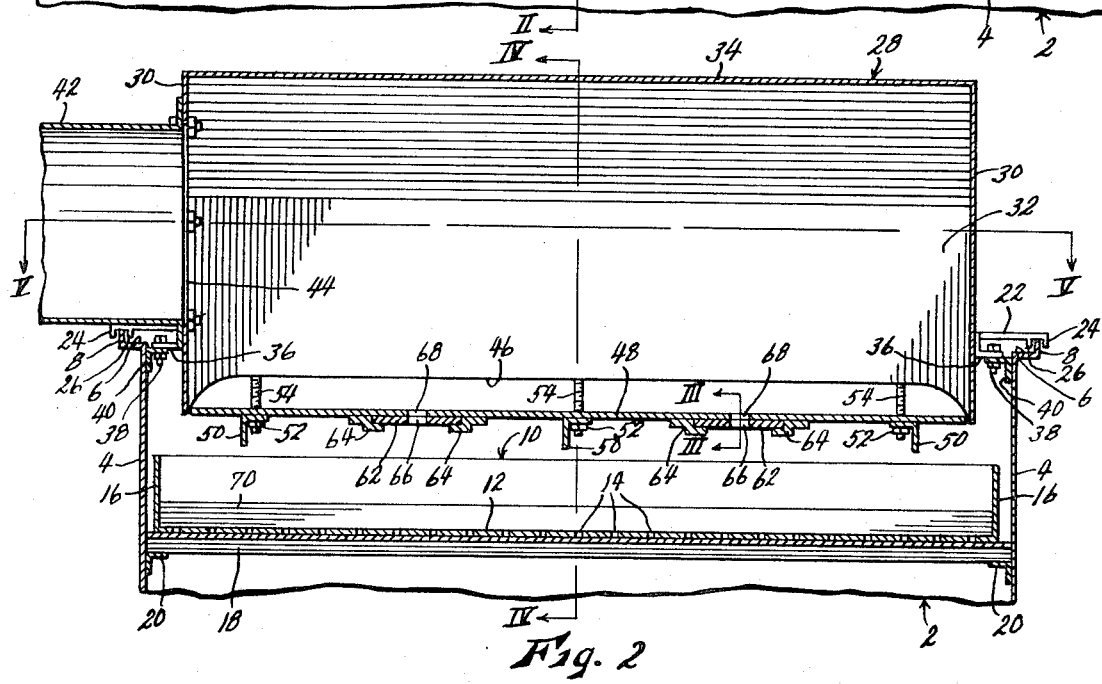
Figure 3:
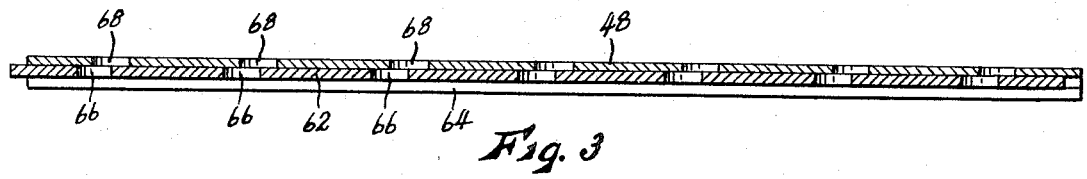
Figure 4:
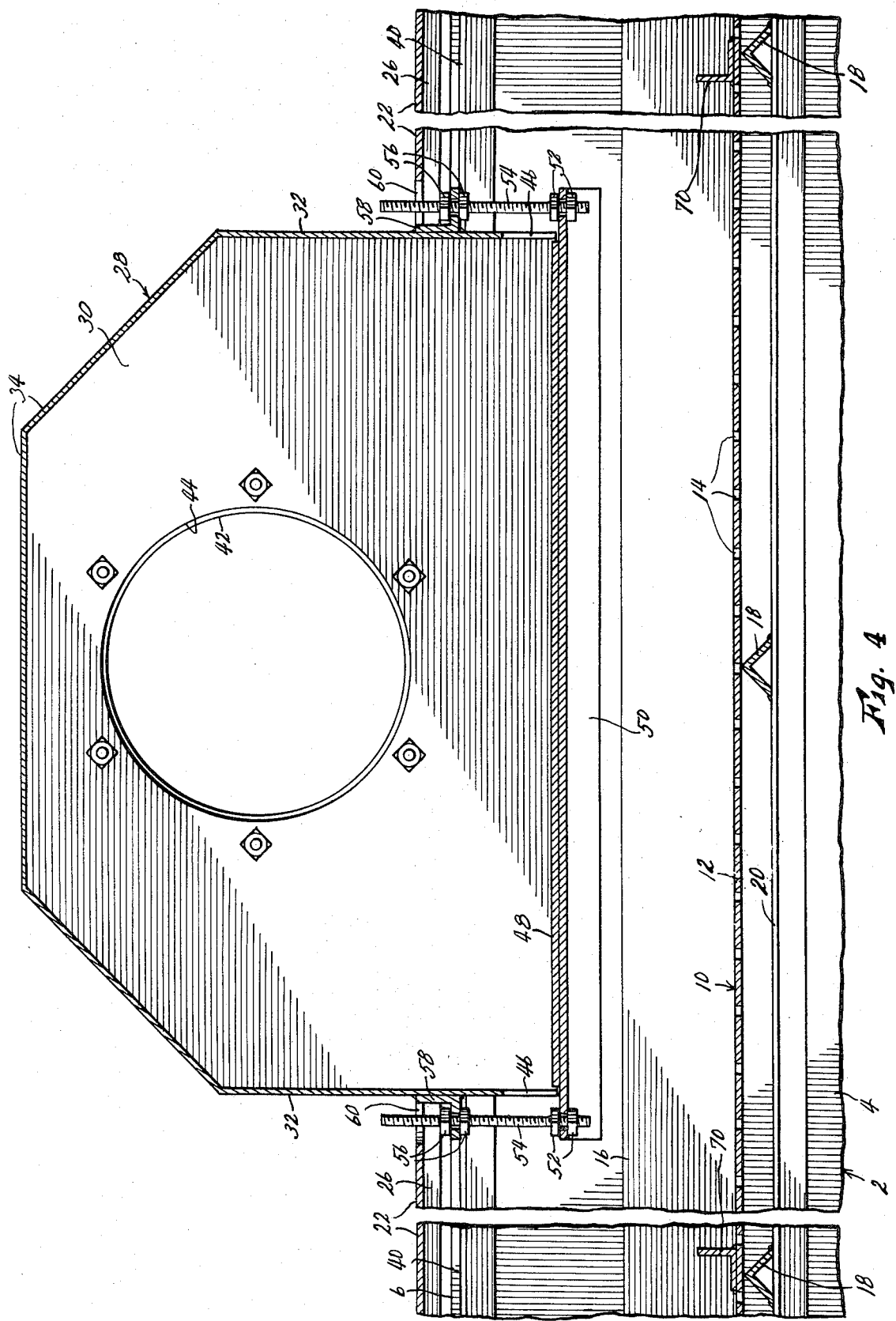
Figure 5:
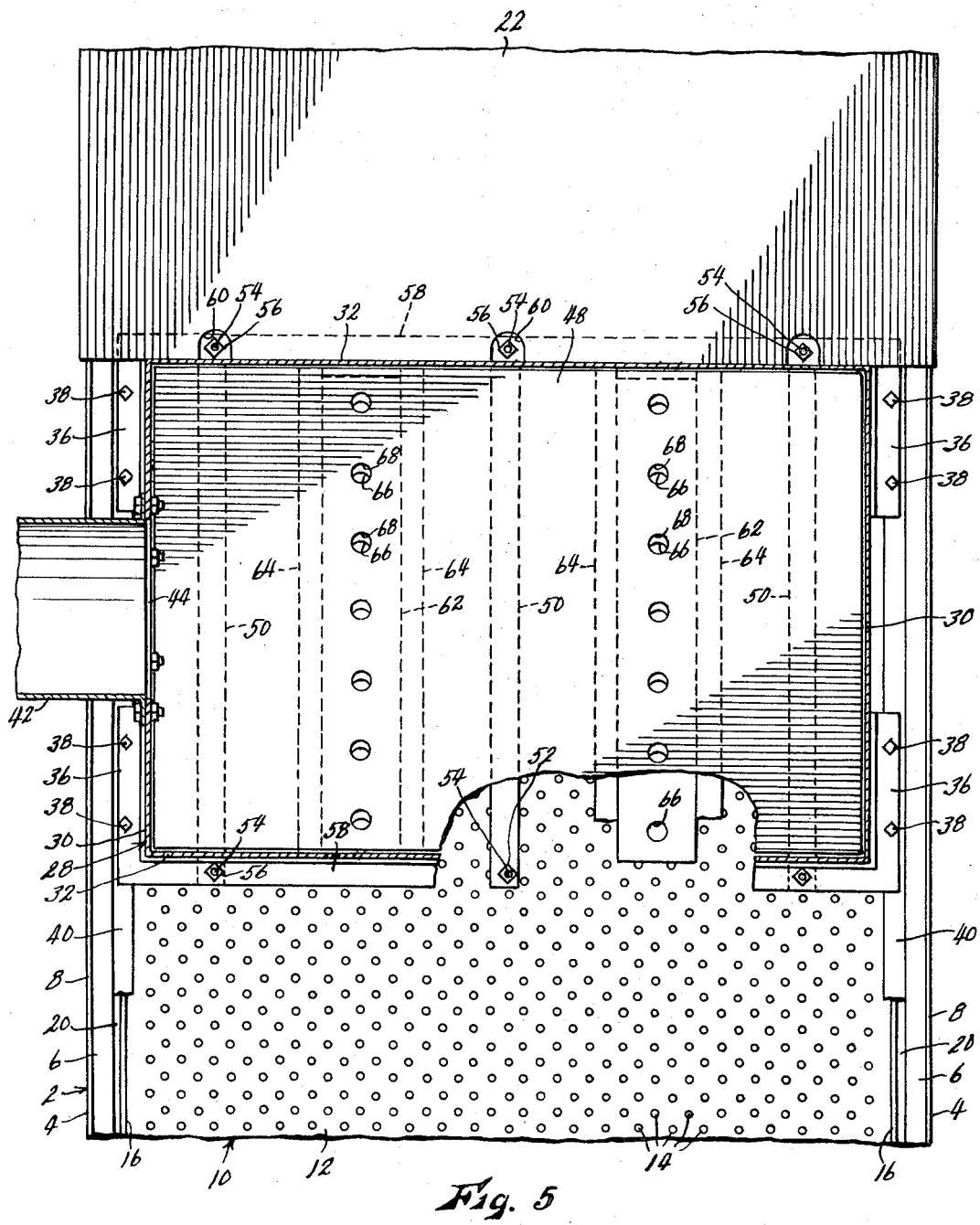

With these objects in view, as well as other objects which will appear in the course of the specification, reference will be had to the accompanying drawing, wherein:

FIG. 1 is a fragmentary side elevational view of the top portion of a chilling cabinet containing a sprinkler pan, showing a liquid distribution apparatus embodying the present invention applied operatively thereto, FIG. 2 is a fragmentary sectional view taken on line II—II of FIG. 1, FIG. 3 is an enlarged sectional view of the header box floor, taken on line III—III of FIG. 2, FIG. 4 is an enlarged, fragmentary sectional view taken on line IV—IV of FIG. 2, with parts broken away, and FIG. 5 is a fragmentary sectional view taken on line V—V of FIG. 2, with parts broken away.

Like reference numerals apply to similar parts throughout the several views, and the numeral 2 applies generally to a cabinet in which it is understood food products to be sprinkled, or sprayed with a liquid coolant or the like may be disposed, or through which said food products are continuously conveyed. The upper portions of the side walls of the tank are indicated fragmentarily at 4. It will be understood that while the width of the cabinet is shown in FIGS. 2 and 5, the length thereof may be many times that actually shown in the fragmentary illustration thereof. The upper edge portions of said side walls are turned outwardly and upwardly to form successively a horizontal ledge 6 and an upstanding lip 8.

The sprinkler pan 10 is disposed horizontally in cabinet 2 just below the top thereof. It has a horizontal floor 12 with perforations 14 formed therethrough in regularly spaced relation over the entire area thereof, and upstanding side walls 16 around its entire periphery. Its horizontal dimensions are only slightly less than the dimensions of cabinet 2, so as to cover substantially the entire area of the cabinet. It is supported by angle iron cross bars 18 which extend horizontally between cabinet side walls 4, which are in turn supported by angle iron ledges 20 affixed to said side walls. Angle irons 18 are preferably disposed with the apex of their flanges uppermost, as shown in FIG. 4, to avoid blockage thereby of the pan perforations 14, and to avoid horizontal surfaces on which liquid might collect and stand. The cabinet may be provided with removable cover plates 22, which cover the entire top of the cabinet except for the area occupied by the header box to be described. Said cover plates are provided with a skirt 24 which depends outside of cabinet lip 8, and a splash lip 26 which depends inside of lip 8, as best shown in FIG. 2, to prevent liquid from escaping from the cabinet after splashing from the pan.

The distribution system contemplated by the present invention includes a liquid header box 28 which is formed of sheet metal and is generally rectilinear in form, having side walls 30, end walls 32, a top wall 34, and being open at its bottom. Said header box projects downwardly into the top portion of cabinet 2, terminating just above pan 10. The width of the box substantially spans the width of the cabinet, its side walls 30 being disposed closely adjacent the cabinet side walls 4, and angle irons 36 affixed to box side walls 30 are releasably secured by bolts 38 to angle iron ledges 40 affixed to said cabinet side walls. It will be seen that box 28 can be moved along the length of the cabinet as desired for a purpose which will presently appear, forming holes in ledges 40 wherever desired for receiving bolts 38. Actually, as previously mentioned cabinets and sprinkler pans thirty to forty feet long are not uncommon, while the "length" of box 28, between end walls 32, need be no more than 2½ to 3 feet. Liquid to be distributed in pan 10 is supplied to header box 28, by any suitable pumping means, not shown, through a large pipe 42 interconnected to one of side walls 30 of said box in communication with a correspondingly sized hole 44 of said side wall. The lower edges of end walls 32 of the header box are notched upwardly as indicated at 46, said notches extending substantially the entire width of the box, as shown in FIG. 2.

The open bottom of header box 28 is obstructed by a planar deflector plate 48, which forms the floor of said box. As best shown in FIG. 5, said deflector plate corresponds closely to the horizontal dimensions of the header box, fitting closely into the extreme lower portion thereof. It is supported by three angle iron beams 50 affixed to the lower surface thereof in transversely spaced relation there-across, said beams extending outwardly from the forward and rearward edges of said plate, beneath the notches 46 of header box end walls 32. Affixed adjustably in each extended end portion of each beam, by means of nuts 52, is the lower end of a vertical bolt rod 54. Each bolt rod extends upwardly, and is adjustably fixed at its upper end, as by nuts 56, to an angle iron support 58 affixed horizontally to the external surfaces of the associated header box end walls 32. It will be apparent that by concurrently adjusting the effective lengths of bolt rods 54 in properly related degrees, by means of nuts 52 and 56, deflector plate 48 may be universally tilted relative to the header box, thereby altering the effective vertical width and contour of notches 46 of end walls 32 of the box for a purpose to be described. Cabinet cover plates 22 normally engage the front and back end walls 32 of the header box, as shown in FIG. 4. If necessary, these cover plates may be notched as indicated at 60 to accommodate the upwardly extending ends of the bolt rods.

A pair of elongated slide plates 62 extend across the lower surface of deflector plate 48, in parallel relation to beams 50 and in transversely spaced relation across the deflector plate. Each slide 62 is supported for longitudinal sliding movement by a pair of guides 64 affixed to the deflector plate. A series of holes 66 are formed through each slide plate 62 along the midline thereof, which are adapted by sliding movement of said slide plate to be moved adjustably into or out of registry, in any desired degree, with series of corresponding holes 68 formed in the deflector plate. Access to slide plates 62, and to bolt rods 54, for the purpose of adjusting them as may be required, may be had simply by sliding either one or both of cover plates 22 along the cabinet away from header box 28, and reaching down into the cabinet.

Under some circumstances, the distribution system may also utilize baffles 70 on the floor 12 of the sprinkler pan 10. As best shown in FIGS. 2 and 4, said baffles are disposed in horizontally spaced apart relation from header box 28, and may constitute angle irons extending horizontally and transversely across the upper surface of said pan floor, and affixed thereto. Any number of these baffles required may be used, at any required spacing along the pan, and of any required height.

In operation, the liquid to be distributed uniformly in the pan 10 is delivered by header box 28 through pipe 42, by any suitable pumping means, not shown. From this point on, however, the distribution is performed by gravity, so that the pumping means need not carry the load of pumping the liquid through a further pipe and nozzle network to distribute the liquid over the pan, so that a substantially less powerful, and hence less expensive, pumping apparatus can be used. In fact, presuming that the liquid is being pumped from floor level, the pumping apparatus is required only to elevate the liquid to the level of the header box, which is seldom more than about 10 feet above the floor, since the header box is never completely filled and is not subjected to pump pressure.

The liquid delivered to the header box, or a proportion of it, is discharged forwardly and rearwardly therefrom through the slots formed between the upper edges of end wall notches 46 and deflector plate 48. These slots are so proportioned that the total required flow, which of course depends on the rate of liquid supply required for each square foot of pan 10, and the area of the pan, cannot flow through notches 46 until the liquid has accumulated in the header box to a level above said notches, thereby imposing a gravity pressure head on the liquid at said notches to increase the rate of flow therethrough. The liquid therefore emerges from said notches with considerable velocity, said velocity being sufficient, if deflector plate 48 is properly adjusted, to insure a uniform rate of flow through pan apertures 14 along the length of the pan, at least those portions not directly beneath the header box, which is a special problem to be discussed below. This longitudinal distribution of liquid along the pan occurs because in portions of the pan directly adjacent the header box, the liquid has just been discharged from said box, and is moving at a velocity so great that a major portion of the liquid "sweeps over" perforations 14 without passing therethrough, and so passes on to more remote portions of the pan. The liquid velocity gradually decreases toward the remote ends of the pan, and the proportion thereof passing through perforations 14 gradually increases, with the result that if the original liquid velocity at notches 46 was correctly related to the length of the tank and the desired flow per unit of area thereof, the desired uniform longitudinal distribution of liquid will be maintained.

To some extent, at least if the desired flow rate per unit of pan area remains constant, the operation as thus far described is self-adjusting to pans of different lengths. That is, for a given unit flow rate a longer pan requires a greater total flow rate, and a higher velocity of the liquid at notches 46, to enable it to reach the remotest portions of the pan, while a shorter tank requires a smaller total flow rate and a lower notch velocity. With a longer pan, therefore, the greater quantity of liquid deposited in the header box produces a higher liquid level therein, and this produces the greater static pressure at notches 46 which results in the required higher notch velocity. On the other hand, the smaller quantity of liquid required for a shorter pan produces a smaller static head in box 28 and the required lower notch velocity. Both of these effects are automatic and occur without adjustment of deflector plate 48. However, vertical adjustment of deflector plate 48, with or without tilting thereof, may be required when it is desired to change the flow rate of each unit of pan area, in pans of any length. This adjustment changes the vertical width and hence the flow rate of the notches, so that the static head, and hence the flow velocity at the notches can be changed regardless of the total flow rate. Thus the required notch velocity can be produced at any given total flow rate. This adjustment still does not necessarily require tilting of the deflector plate.

However, tilting of the deflector plate, by adjusting bolt rods 54 as previously described, serves several useful functions. For example, it may not always be possible to install header box 28 midway between the ends of the pan, so that one end of said pan is closer to the header box than the other. In such cases, the notch 46 confronting the closer end of the pan should obviously pass less liquid, and at a lower notch velocity, than the notch confronting the more distant end of the pan. This effect can be obtained by tilting the deflector plate upwardly toward the notch confronting the closer end of the pan. This restricts that notch, reducing the flow rate thereof as compared to that of the notch confronting the farther pan end, and since the more restricted notch is then somewhat elevated as compared to the other notch, it has less static pressure head operating against it, which produces a lower notch velocity. Secondly, if the liquid enters the header box through a single, wide-open inlet, as for example through one of the side walls 30 thereof as shown, which is most advantageous from the point of view of reduction of the pumping power required, there is the possibility that its entry velocity will cause more liquid to be delivered to one side of the box than the other, so that one side of the pan receives an excessive amount of liquid while the other side receives a deficient supply. For example, as shown the side of the box remote from inlet opening 44, and the corresponding side of pan 10, will probably receive more liquid than the side adjacent said inlet opening. This tendency can be defeated by tiltably adjusting the deflector plate laterally of the pan, normally to elevate the edge thereof at the side of the box receiving the excess amount of liquid whereby to reduce the effective vertical width of notches 46 at that side of the box, and hence to reduce the quantity of liquid ejected from said notches at that side, forcing a portion of the liquid which would otherwise have been ejected at that side of the box to flow toward and be ejected from the opposite side of the box. Actually, the flow pattern within the box may be considerably more involved than in this simplified example. In some installations, for example, the liquid is collected in a sump at the bottom of cabinet 2 and recirculated to header box 28 for continuous use. In such cases, a portion of the main flow is diverted, at some point exterior to the cabinet, and re-refrigerated to extract therefrom heat picked up within the cabinet. This re-refrigerated portion of the liquid may be returned to the header box through some inlet thereof other than inlet 44, and this will alter the flow pattern within the box, and the deflector plate may require re-adjustment as to lateral tilting thereof.

Due to the horizontal velocity with which the liquid engages the pan floor from emerging from notches 46, this velocity being in directions away from box 28, the area of pan 10 directly beneath said box, and the zone of the cabinet directly below this portion, would normally receive only a deficient supply of liquid, amounting in some cases to a substantial "void," if some means were not provided to fill the deficiency. The holes 68 of the deflector plate, as regulated by holes 66 of slide plates 62, perform this function, passing just enough liquid when properly adjusted to replace any deficiency of liquid supply to the portion of the pan directly beneath the deflector plate. It is preferable, as shown, that holes 68 of the deflector plate be arranged in two sets respectively adjacent laterally opposite sides of the deflector plate, and that these two sets of holes be adjustable each independently of the other, since they may be required to deliver different quantities of liquid to the respective sides of the pan for the same reasons that the deflector plate may require lateral tilting to deliver different quantities of liquid to the respectively opposite sides of notches 46.

Finally, it will appear that in some installations, particularly those requiring very large total flow rates, notches 46 may even when adjusted to their maximum vertical widths, produce notch velocities of the liquid which are excessively high, higher than is needed to supply an adequate amount of liquid to the most remote portions of the pan, and so high than in portions of the pan directly adjacent the header box, too great a proportion of the liquid "sweeps over" pan apertures 14 without passing therethrough, resulting in a deficiency of supply to zones of the cabinet therebeneath, such a deficiency resulting from excessive velocity rather than from any actual deficiency of available liquid. This condition represents a circumstance beyond the normal range of adjustability provided by deflector plate 48, and occurs principally where, for example, the pan is not particularly long and hence does not require a particularly high notch velocity of the liquid, but has a comparatively high liquid capacity resulting from more or larger holes 14 per unit of area thereof, and hence requires a high total flow rate. In such cases, baffles 70 may be used, and function as a brake or retarder for slowing the liquid velocity as much as may be required. Generally, the degree of retardation depends on the vertical height of the baffles, which may be determined correctly by experimentation. Usually, one baffle each disposed respectively forwardly and rearwardly of the header box, along lines just outwardly of the lines at which liquid from notches 46 first contacts the pan floor, are fully adequate, although more baffles, spaced successively farther away from the header box and generally of successively lower levation, may be used to perform the retardation in successive increments if found necessary or desirable.

All of the above described adjustments and variations are closely interrelated in a rather intricate manner, often to the point that they defy pre-setting thereof even with any amount of detailed structural data. Even seemingly identical installations display often substantial differences of distribution uniformity, for reasons often difficult to analyze and detect, such as slight off-level dispositon of pan 10, or differences in the smoothness or configuration of the edges of the various holes and apertures used. However, with the present structure it is relatively easy and convenient to provide the desired uniform distribution by test, such for example as by placing a compartmentalized tray beneath pan 10, measuring the depth of liquid accumulating in each tray compartment during a given period of operation, and making adjustments of deflector plate 48 and baffles 70 to correct any variation beyond allowable limits.

While I have shown and described a specific embodiment of my invention, it will be readily apparent that many minor changes of structure and operation could be made without departing from the spirit of the invention.

What I claim as new and desire to protect by Letters Patent is:

1. In combination with an elongated horizontal sprinkler pan having a perforated floor, an apparatus for distributing liquid uniformly over said pan comprising:
    a. a header box adapted to be disposed above said pan intermediate the ends thereof and substantially spanning the width thereof, said box having a floor disposed above said pan, and apertures formed in walls thereof above said floor and directed horizontally toward each end of said pan, said header box apertures extending horizontally substantially the full width of said box transversely of said pan, and said header box floor comprising a planar deflector plate independent of the remainder of said box and intersecting said apertures whereby to form the effective lower margins of said apertures,
    b. means affixing said deflector plate to the remainder of said header box, said affixing means being adjustable whereby to move said deflector plate vertically to adjust the effective vertical width of said apertures, and
    c. means for admitting liquid to be distributed in said pan into said header box at a rate sufficiently high that said liquid accumulates therein to a level above said apertures, whereby to provide a static pressure head operable to eject liquid through said apertures at a substantial velocity.

2. An apparatus as recited in claim 1 wherein said affixing means is additionally adjustable whereby to tilt said deflector plate longitudinally of said pan, whereby to adjust the effective vertical widths of the apertures at the respective ends of said header box independently.

3. An apparatus as recited in claim 1 wherein said affixing means is additionally adjustable whereby to tilt said deflector plate transversely of said pan, whereby to adjust the effective vertical widths of said apertures variably from side to side of said header box.

4. An apparatus as recited in claim 1 wherein said affixing means is additionally adjustable whereby to tilt said deflector plate universally, both laterally and longitudinally of said pan.

5. An apparatus as recited in claim 1 wherein the floor of said header box has apertures formed therethrough to supply liquid to the portion of the pan directly therebeneath, said apertures being arranged in two sets disposed respectively adjacent the laterally opposite sides of said header box, and with the addition of means carried by said deflector plate and operable to adjust the effective areas of the apertures of the floor thereof, said adjusting means being operable to adjust the effective areas of the two sets of apertures independently.

6. An apparatus as recited in claim 1 with the addition of one or more upstanding baffles affixed to the floor of said pan, said baffles extending transversely of said pan in spaced apart relation from said header box in a direction longitudinal to said pan.

* * * * *